United States Patent [19]

Jagodzinski et al.

[11] 4,280,990

[45] Jul. 28, 1981

[54] HIGH PRESSURE PROCESS FOR RECOVERY OF SULPHUR FROM GASES

[75] Inventors: Richard F. Jagodzinski; Richard K. Kerr, both of Calgary, Canada

[73] Assignees: Hudson's Bay Oil and Gas Company Limited; Alberta Energy Company Ltd., both of Alberta, Canada

[21] Appl. No.: 136,789

[22] Filed: Apr. 3, 1980

[30] Foreign Application Priority Data

Dec. 11, 1979 [CA] Canada .................................. 341597

[51] Int. Cl.$^3$ ............................................. C01B 17/04
[52] U.S. Cl. ................................ 423/574 R; 423/576; 422/190; 422/191
[58] Field of Search ............... 423/573, 574, 576, 222; 422/190, 191, 193

[56] References Cited

U.S. PATENT DOCUMENTS

| | | | |
|---|---|---|---|
| 1,922,872 | 8/1933 | Thompson | 423/576 |
| 3,532,468 | 10/1970 | Beavon | 423/574 |
| 4,138,473 | 2/1979 | Gleck | 423/576 |

FOREIGN PATENT DOCUMENTS

| | | | |
|---|---|---|---|
| 146141 | 6/1920 | United Kingdom | 423/573 |
| 689664 | 9/1953 | United Kingdom | 423/576 |

*Primary Examiner*—G. O. Peters
*Attorney, Agent, or Firm*—Kenway & Jenney

[57] ABSTRACT

A process is provided for producing elemental sulphur from a hydrogen sulphide and sulphur dioxide containing gas stream by a Claus type of catalytic reaction. The process is based on the discovery that the conventional Claus catalyst, in the presence of liquid sulphur and at pressures considerably greater than one atmosphere, is significantly active toward the Claus catalytic reaction. Thus, in accordance with the invention, increasing the pressure of the reaction in the presence of liquid sulphur increases both the catalytic activity and the elemental sulphur conversion. The process involves introducing a compressed hydrogen sulphide and sulphur dioxide containing gas stream into a catalytic reactor and reacting the gases in a Claus catalyst bed in the reactor to produce elemental sulphur under conditions of temperature and pressure such that water in the reactor exists only as water vapor and sulphur vapor is condensed in the catalyst bed, being removed therefrom as a liquid. The pressure within the reactor is preferably between 5 and 50 atmospheres absolute.

68 Claims, 3 Drawing Figures

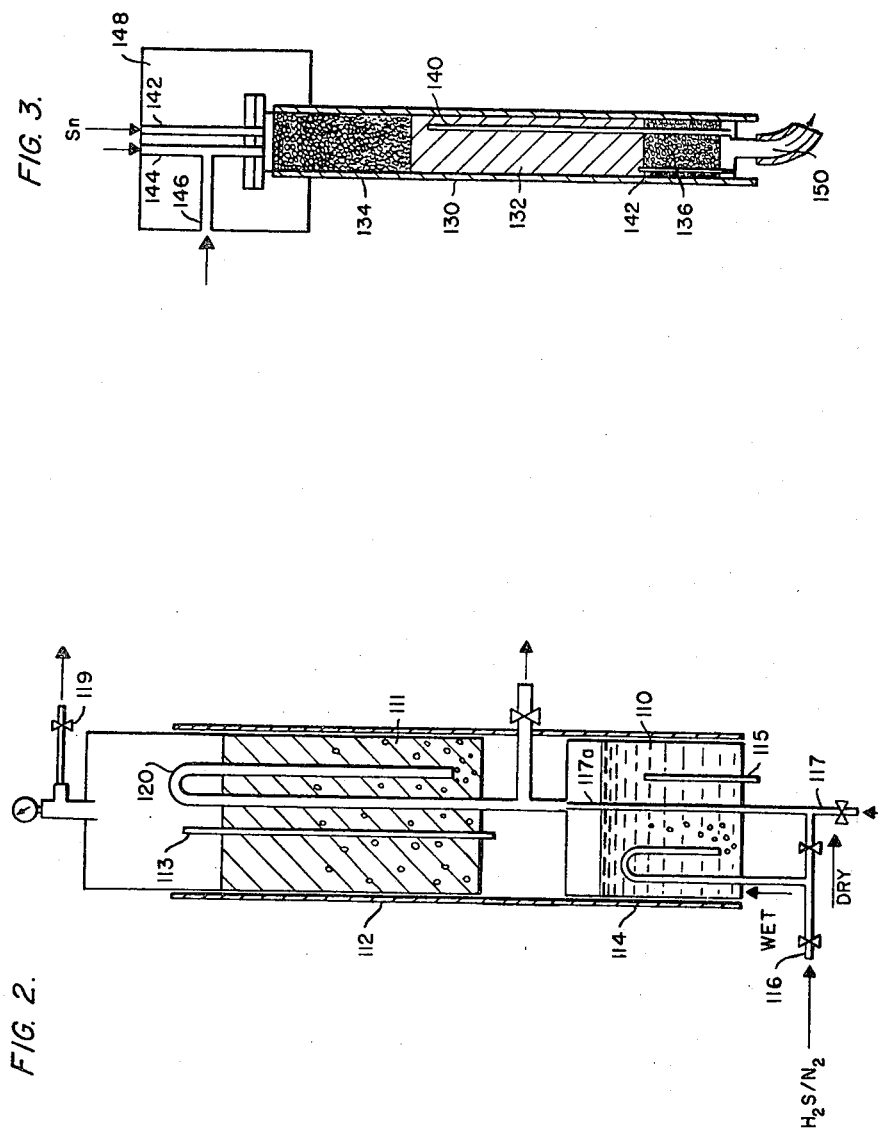

HIGH PRESSURE PROCESS FOR RECOVERY OF SULPHUR FROM GASES

BACKGROUND OF THE INVENTION

The present invention relates to a process for reacting hydrogen sulphide and sulphur dioxide gases to produce elemental sulphur and water vapour.

The process is useful in the removal of hydrogen sulphide from a natural gas or industrial gas source (which may include gases produced from a hydrodesulphurization unit of an oil refinery). For example, gas wells presently exist which produce so called "sour gas". Sour gas is a term applied to the products of gas wells, or other industrial gas sources which contain hydrogen sulphide, usually in fairly low concentrations. Processes for removing hydrogen sulphide from sour gas or from high sulphur petroleum products, natural gas, coal, tar sands, heavy oils and fuel oil generally result in the production of an acid gas stream in which the hydrogen sulphide is concentrated and which may contain other gaseous ingredients such as carbon dioxide, water vapour, ammonia, and other impurities. Removal of hydrogen sulphide from acid gases before discharge into the atmosphere is required for environmental and safety reasons.

Conventionally, a product to be treated containing hydrogen sulphide such as a sour gas is passed through a scrubbing unit where hydrogen sulphide is absorbed, and the scrubbing liquid is then regenerated to produce an acid gas stream at substantially atmospheric pressure. The hydrogen sulphide in the acid gas is then converted to water vapour and elemental sulphur by an oxidation process generally known as the Claus process which is a low pressure process involving the following general reaction:

$$\tfrac{1}{2}O_2 + H_2S \rightarrow H_2O + S \tag{1}$$

This general reaction is usually performed in two stages in a process known as the modified Claus process. First a portion of the hydrogen sulphide in the acid gas stream is burnt with air in a combustion furnace as follows:

$$H_2S + 3/2 O_2 \rightarrow SO_2 + H_2O \tag{2}$$

The remaining hydrogen sulphide is then reacted with the resulting sulphur dioxide in a catalytic zone over a suitable Claus catalyst, such as activated alumina, as follows:

$$2H_2S + SO_2 \rightleftharpoons 2H_2O + 3/n\, S_n \tag{3}$$

where $S_n$ is a complex molecular mixture of elemental sulphur vapour; n has a value between 7 and 8. The sulphur vapour is recovered by condensation, either in a condenser and a separator, or in a scrubbing tower. The by-product gases from reaction (3) are usually reheated and subjected to additional stages of the catalytic reaction and sulphur condensation.

Reaction (3), hereinafter referred to as the Claus catalytic reaction, in the conventional modified Claus process is performed at about one atmosphere or slightly greater pressures, and at temperatures of about 195°–370° C. It is to be expected from equilibrium theory (Le Chatelier's principle) that an increase in pressure would increase the yield of sulphur from reaction (3), since n is always greater than 3. Hitherto however pressures substantially higher than atmospheric have been avoided since it is well known that even fairly small increases in pressure result in the formation of liquid sulphur which plugs the catalyst and halts the reaction.

It can be shown, based on theoretical and empirical formulae, that if Claus operating pressures are increased and, at the same time, operating temperatures are increased to maintain the system at or above the sulphur dewpoint; then the net effect on reaction yield is negative. Thus, based on conventional operating principles, an increase of system pressure would not be considered a viable alternative to improve process yields.

To avoid condensation of sulphur on the catalyst, after sulphur has been removed in a condenser between catalytic zones, the gases leaving the condenser are reheated before re-entering the catalytic zones. Both the condensing and reheating steps involve an inefficient and expensive gas-liquid or gas-gas heat exchange.

Additionally, sulphur mist is formed in the conventional Claus plant. Because of limitations arising from operating at near atmospheric pressures, efficient removal of sulphur mist is not possible. Thus sulphur mist is often contained in the tail gas which leaves the last catalytic or condensing zone of a Claus plant.

The Claus catalytic reaction is exothermic so that the use of low temperature favors the efficient elemental sulphur production at least when equilibrium conditions apply to the reaction. At atmospheric pressures, temperatures below about 195° C. are desirable for efficient production. These low temperatures, however, are not economical in practice because of the reduced catalytic activity arising at these conditions. Thus, it is preferred to obtain a higher reaction rate by using higher temperatures, even though this reduces the theoretical production obtainable.

Due to the above mentioned considerations, the conventional Claus process is generally limited to about 97.5% to 98.5% recovery of the sulphur contained in an acid gas stream. With environmental regulations indicating a need for at least a 99% sulphur removal efficiency, a more complete sulphur recovery process is needed. For this reason, Claus plants are often operated in tandem with a tail-gas treating unit as described below.

The opinion generally shared by those familiar with the Claus process is that catalytic activity decreases substantially once liquid sulphur is produced in a conventional Claus catalyst bed, e.g., see Claus Kinetics on Alumina, J. H. Blanc et al., Societe Nationale Elf Aquitaine, France, and Aquitaine Co. of Can. Ltd., Proc. of 5th Canadian Symposium on Catalysis, October, 1977.

This opinion is apparent in the design of a number of commercial processes to recover sulphur from a Claus tail gas. In these processes, the tail gas at about one atmosphere pressure is reacted in a catalytic zone at conditions to cause elemental sulphur to condense in the catalyst bed. Once a catalyst bed is loaded with sulphur, the bed must be taken off stream and regenerated. Exemplary of these processes are the Sulfreen process practiced by the Aquitaine Co. of Can. Ltd. at the Ram River Gas Plant, Alberta; and the MCRC Process practiced by the Analine Sulphur Plant at Wood River, Illinois.

The present invention is based on the discovery that, given suitable operating conditions, the Claus catalytic reaction can proceed efficiently at high pressures (between about 5 and about 50 atmospheres absolute) which cause liquid sulphur to condense in the catalyst bed.

In accordance therefore with one aspect of the invention, in a sulphur producing process in which hydrogen sulphide ($H_2S$) and sulphur dioxide ($SO_2$) gases are continuously introduced into a reactor containing a bed of a catalyst which causes these gases to react to produce elemental sulphur, the gases when in the reactor are maintained at such conditions of temperature and pressure that free water in the reactor exists only as water vapour and sulphur is condensed in the catalyst bed, the sulphur being continuously removed from the bed as a liquid, and the pressure in the reactor being maintained at at least 5 atmospheres absolute.

The term "free water" is intended to exclude water chemically combined with or adsorbed onto the catalyst.

We have found that, under the conditions described, the catalyst, even though saturated with liquid sulphur, remains effective. In fact, it is preferred in accordance with this process that the catalyst be substantially saturated with liquid sulphur. It is believed that the catalyst remains active in these conditions because liquid sulphur serves to reduce sulphates on the catalyst. Sulphates are known catalyst poisons in the Claus reaction which are formed on the catalyst during the operation of the conventional process.

Due to the exothermic nature of the Claus catalytic reaction, it is generally desirable to cool the catalyst bed. In accordance with another feature of the invention, the temperature in the catalyst bed is controlled with a liquid coolant, which is preferably liquid sulphur, sprayed on to or otherwise applied to the bed. The temperature of the liquid sulphur being sprayed is in the range of about 120° to 150° C., and the temperature of the bed is such that the gases on leaving the bed (i.e., the "bed exit temperature") have a temperature between about 125° C. and about 375° C., and preferably from 150° C. to 200° C.

The reactor preferably contains several catalyst beds arranged to receive the gases in turn, the liquid sulphur being removed as an individual stream from each bed.

The optimum pressure within the bed is chosen having regard to various parameters including the temperature and the proportion of $H_2S$ in the incoming gas, and in accordance with ecomonic factors such as the cost of compressing the gas. Increasing the pressure tends to produce more sulphur from the reaction (3) as discussed above and the use of higher pressures reduces the size of the apparatus leading to lower cost. However, it is not thought that pressures above 50 atmospheres (absolute) would be useful. A pressure of about 5 atmospheres is needed to give a 99% conversion of sulphur. However, the normal range of operating pressures is expected to be between 10 and 20 atmospheres absolute.

For particular conditions, suitable pressures may also be calculated for desired conversion and recovery efficiencies. The Claus conversion efficiency ($\xi_c$) is the fraction of inlet combined sulphur that is converted to elemental sulphur; the Claus recovery efficiency ($\xi_R$) is the fraction of inlet combined sulphur that is recovered as elemental liquid sulphur. The difference between these efficiencies is primarily due to sulphur vapour losses.

Certain empirical formulae may be used to calculate suitable pressures when other conditions have been determined and assuming a target conversion or recovery efficiency, and also assuming that the $H_2S$ and $SO_2$ that enter the reactor are in a substantially stoichiometric ratio.

For example, if a determination is made of a target conversion efficiency $\xi_c(P)$, the pressure may be chosen such that pressure P in absolute atmospheres is at least that given by the formula:

$$P = 1.10 \left( \frac{\xi_c(P)(1 - \xi_c(1))}{\xi_c(1)(1 - \xi_c(P))} \right)^3$$

where;

$\xi_c(1) = 1 - \exp(-6.0698 \times 10^{-5} T^2 + 0.048175T - 11.0933 + 0.282x^2 - 0.667x)$ and where;

$\xi_c(1)$ = equilibrium fractional conversion efficiency at 1 atm pressure $\xi_c(P)$ = target, or desired fractional conversion efficiency pressure P P = reactor pressure, in absolute atm x = mole fraction of $H_2S$ in acid gas T = reactor exit temperature, °C.

and where parameters are constrained to the following ranges:

0.9 < ($\xi_c$1) < 1.0
0.2 < X < 1.0
160 < T < 300
1 < P < 50

Preferably, the conversion efficiency $\xi_c(P)$ will be at least 0.99 (99%).

Alternatively, if a determination is made of a target recovery efficiency $\xi_R(P)$, the pressure may be chosen such that pressure P in absolute atmospheres is at least that given by the formula:

$$P = 1.10 \left( \frac{\left[\xi_R(P) + \frac{1}{P\eta}(1)\right][1 - \xi_c(1)]}{\xi_c(1)\left[1 - \xi_R(P)\eta - \frac{1}{P}(1)\right]} \right)^3$$

where;

$n(1) = \exp(f_R(T,x)) - \exp(f_c(T,x))$
$\xi_c(1) = 1 - \exp(f_c(T,x))$
$f_R(T,x) = -2.83 \times 10^{-5}T^2 + 0.05064T - 10.4578 + 0.862x^2 - 1.83x$
$f_c(T,x) = -6.0698 \times 10^{-5}T^2 + 0.04818T - 11.0933 + 0.282x^2 - 0.667x$ and where;

$\xi_R(P)$ = target, or desired fractional recovery efficiency in the reactor, at pressure P $\xi_c(1)$ = equilibrium fractional conversion efficiency at 1 atm P = reactor pressure in absolute area x = mole fraction of $H_2S$ in the acid gas T = reactor exit temperature in °C.

and where the parameters are constrained to the following ranges:

0.9 < $\xi_c(1)$ < 1.0
0.2 < x < 1.0
160 < T < 300
1.0 < P < 50.0

Similarly here, the recovery efficiency chosen will preferably be at least 0.99 (99%).

The factor 1.10 appearing in these formulae is due to the desired pressure being 10% higher than the theoretical pressure to account for lack of complete equilibrium in the reaction.

Pressures may also be chosen according to experimental results. For example, if the process is to be used for treating a gas mixture including a stoichiometric ratio of $H_2S$ and $SO_2$ produced by partial combustion of an acid gas containing say from 40 to 100% $H_2S$, the pressure may be chosen so that when the bed exit gas temperature is at least 160° C., and with a total residence time in the beds of no more than 15 seconds, at least 99% of the sulphur contained in the acid gas is removed. Preferably, this is achieved with no more than ten catalyst beds.

"Residence time" as used herein means the superficial or apparent residence time, i.e. the time assuming a given size for the bed but also assuming that the catalyst and sulphur occupy no space in this bed; this is conventional.

Alternatively, with the same conditions of temperature and residence time, the pressure may be chosen so that outlet hydrogen sulphide concentration is less than 1500 parts per million and the outlet sulphur dioxide concentration is less than 750 parts per million (by volume).

Preferably, both the liquid sulphur and the gases pass co-currently through the bed. However, counter current or cross flow may also be used.

The catalyst used is preferably an alumina catalyst of the type conventionally used for the Claus catalytic reaction.

The process of this invention can achieve considerably higher recovery efficiency than a conventional Claus plant, eliminating the need for the separate tail gas plant which is required where a conventional Claus plant is operated in an area with strict environmental regulations. Also, the sulphur removal process of this invention can be used with advantage to remove the sulphur from the tail gas of a conventional Claus plant; such a process works continuously unlike in the prior art. Thus, in accordance with a further aspect of the invention, a continuous process for producing sulphur from the tail gas of a conventional Claus plant comprises the steps of: passing the tail gas stream through a compressor and thence at a pressure considerably higher than atmospheric into a reactor containing a bed of catalyst which causes these gases to react to produce elemental sulphur, the reactor being maintained at such conditions of pressure and temperature that free water in the reactor exists only as water vapour and sulphur is condensed in the catalyst bed, the sulphur being removed therefrom as a liquid.

The high pressure reactor which receives the tail gas is preferably arranged to remove enough sulphur that 99% of the sulphur entering the conventional Claus plant is removed before the gas leaves the high pressure reactor. This can be assured by arranging that the high pressure reactor operates at a pressure such that with a bed exit temperature of at least 160° C. and with a residence time of gases in the catalyst of no more than 15 seconds, at least 99% of the total combined hydrogen of the gases entering the high pressure reactor (in stoichiometric ratio) leaves this reactor as water vapour. This is a measure of the conversion efficiency of the overall plant. Since most of the combined hydrogen of the acid gases entering the conventional plant is contained in the $H_2S$, if 99% of the combined hydrogen contained in the $H_2S$ and $H_2O$ entering the high pressure reactor leaves this as water vapour, then the overall sulphur removal in the plant must be close to 99%.

A high pressure reactor of this kind, receiving the tail gas of a conventional Claus plant, may have only a single bed.

The invention further provides apparatus for reacting hydrogen sulphide and sulphur dioxide gases together to remove sulphur from said gases, including: a reactor containing a bed of a catalyst which causes said gases to react and produce elemental sulphur; supply means suitable for supplying compressed gases including hydrogen sulphide and sulphur dioxide to said reactor at a pressure of at least 5 atmospheres absolute; means for removing liquid sulphur from said bed and for passing the liquid sulphur out of the reactor; and means for cooling said bed so that the conditions of temperature and pressure in the bed allow the compressed hydrogen sulphide and sulphur dioxide to react to produce liquid sulphur in said bed while water therein only exists as water vapour.

A process for recovering elemental sulphur from an acid gas stream is proposed in U.S. Pat. No. 2,994,588 to Eickmeyer (issued Aug. 1, 1961). In that proposed process, a gas stream containing hydrogen sulphide and sulphur dioxide is reacted in a catalyst bed which is cooled with liquid sulphur. The liquid sulphur coolant includes a substantial quantity of absorbed hydrogen sulphide in order to lower its viscosity. In the Eickmeyer process absorption of $H_2S$ by the liquid sulphur used to cool the bed plays an important part in the process. Thus, the bed is not cooled with substantially pure liquid sulphur, but with sulphur containing hydrogen sulphide. Furthermore some sulphur is removed from the top of the reactor as a vapour and the sulphur removed as a liquid is recycled.

While Eickmeyer did not disclose the pressures at which he proposed to operate his Claus catalytic reaction, the pressures are limited by several factors. Firstly, the hydrogen sulphide containing acid gas stream enters Eickmeyer's catalytic reactor from a conventional amine system. The pressures of the latter are limited to about 15 psig. Furthermore, an air blower is used to introduce air into the Claus combustion furnace from which the sulphur dioxide containing gases are introduced into the catalytic reactor; such an air blower is limited to pressures of about 30 psig (or 3 atmospheres absolute pressure). Eickmeyer does not suggest therefore operating the catalytic reactor at pressures above about 2 or at most 3 atmospheres.

Also, in Eickmeyer, the use of liquid sulphur to absorb $H_2S$ means that the amount of liquid sulphur which is recirculated is very large compared to the amount of liquid sulphur produced by the process. In the first embodiment of Eickmeyer's process, the liquid sulphur is recirculated to an absorber vessel separate from the reactor. In the second embodiment, the absorption takes place in a packed bed at the bottom of the main reaction vessel. It is calculated, using the figures given by Eickmeyer for solubility of $H_2S$ in liquid sulphur, that the first embodiment of his process would involve recirculating an amount of liquid sulphur more than 150 times greater than that produced by the process. It is not possible to calculate the amount recirculated in the second embodiment, but seemingly this would still be quite high. By contrast, the present invention uses recirculated sulphur only for cooling and not to absorb $H_2S$, and this invention uses much smaller amounts of recirculated sulphur, usually from 2 to 20 times the amount of net sulphur production (i.e., the total production of all the beds of the reactor).

It may also be noted that Eickmeyer does not suggest removing the sulphur as individual liquid streams from separate catalyst beds; nor does he suggest the possibility of using a high pressure continuous catalytic process for producing sulphur from the tail gas of a conventional Claus plant.

To our knowledge no one has hitherto demonstrated a catalytic process to operate efficiently and continuously at pressures considerably greater than atmospheric, while elemental sulphur is condensed in the catalyst bed from which it is removed as a liquid.

BRIEF DESCRIPTION OF THE DRAWING

FIG. 2 is a sectional drawing of a laboratory reactor used to demonstrate catalytic activity of a Claus catalyst at elevated pressures in the presence of liquid sulphur; and FIG. 3 is a sectional drawing of a further laboratory reactor.

DESCRIPTION OF THE PREFERRED EMBODIMENTS

Figure 1:
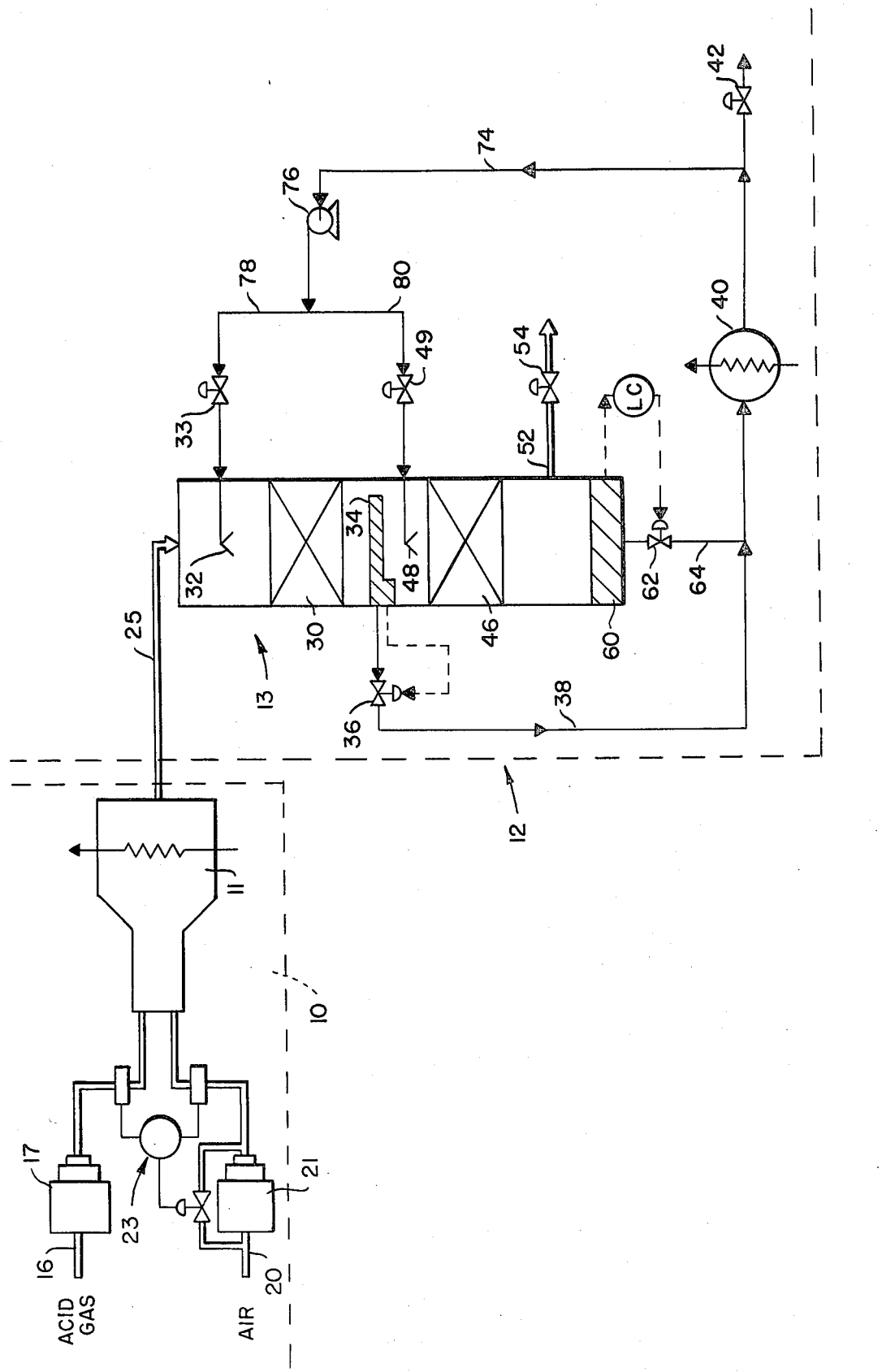
FIG. 1 is a schematic diagram of a plant for removing $H_2S$ from acid gas in accordance with the present invention.

FIG. 1 shows a two stage reactor including a first stage 10 which includes a generally conventional combustion furnace 11, and a second stage 12 which includes a pressurized catalytic reactor 13 in accordance with the present invention.

Acid gas produced from a scrubbing unit and containing $H_2S$ along with carbon dioxide and water vapour enters the first stage by line 16 and is compressed in compressor 17 to about 20 atmospheres pressure absolute. Air enters the first stage via line 20 and is similarly compressed by compressor 21. The compressed air and acid gases are then burnt in combustion furnace 11 so that a part of the $H_2S$ in the acid gas is oxidized to $SO_2$ in accordance with equation (2) above. The supply of air is regulated by the control system indicated at 23 so that only one third of the amount of $H_2S$ entering the furnace is converted to $SO_2$; this means that the $H_2S$ and $SO_2$ gases leaving the furnace are in the correct stoichiometric ratio in accordance with equation (3) above. This procedure is standard practice in conventional Claus plants.

The gases leaving furnace 11 via line 25 provide the feed gas for the pressurized catalytic reactor 13; this feed gas typically has a temperature of 325° C. and is a well mixed stream having the following composition (by volume):
$H_2S$—7.90%
$SO_2$—3.95%
$H_2O$—24.81%
$N_2$—55.93%
$CO_2$—7.41%

The above figures and all figures given herein relating to percentage composition are given on a sulphur, vapour and mist-free basis.

The reactor has substantially the same pressure (20 atmospheres) as the furnace 11. The gases pass downwardly through the reactor, and into a first (upper) catalytic bed 30 which is a fixed bed of a Claus catalyst retained on a horizontal screen which extends across the reactor. The catalyst may be activated alumina spheres or pellets as are commonly used in Claus reactors. A suitable catalyst has the following composition:
Alumina—93.50% by weight
Sodium hydroxide (as oxide)—0.45% by weight
Iron - as $Fe_2O_3$—0.02% by weight
Silica—0.02% by weight
and has:
Surface area—345 $m^2$/gram
Pore volume—0.4 $cm^3$/gram
Mean Pore Diameter—50-52 Angstrom units
Bulk Density—46 lb/cu. ft.
Water content (as shipped)—6% by weight Pellet size may vary depending on the gas flow rate. However, in this process it is possible to obtain good reaction rates by the use of small pellets; the increased back pressure resulting from such small pellets is not important since the overall pressure available is so much greater than in the conventional Claus process.

A spray head 32 sprays liquid sulphur at a temperature of about 130° C. to remove heat from the bed and to maintain this at a suitable temperature. The amount of cooling sulphur applied to the bed, which is controlled by valve 33, is such that the temperature of gases leaving the bed (the bed exit temperature) is at about 275° C. The flow of sulphur provided by head 32, together with the sulphur produced and condensed in the bed, is such that the bed is saturated with liquid sulphur at all times when the reactor is operating normally. Also, conditions are such that no water is condensed in the bed or is produced other than as water vapour. The residence time of the gases in the bed is less than 15 seconds and preferably about 5 seconds. Liquid sulphur drips from the bottom of bed 30 into a collector tray 34 and is removed through valve 36 and line 38 passing eventually through sulphur cooler 40 and leaving the system through outlet valve 42. The sulphur leaving the tray 34 has a temperature of about 275° C. A level detector controls valve 36 to maintain some liquid in tray 34, so that the temperature of the liquid sulphur collecting can be monitored.

The gases leaving the bottom of the first bed 30 will contain about 0.5% $H_2S$ and about 0.25% $SO_2$ considered on a sulphur-free basis. These gases pass down through a second catalytic bed 46 which is similar to bed 30 in respect of the form of the bed and its catalyst, and the cooling arrangement including a spray head 48 for liquid sulphur is also the same as for the first bed. The liquid sulphur supplied through head 48 is however regulated (by valve 49) so that bed 46 operates cooler than bed 30, the gases leaving this bed having a temperature of 195° C., so that the equilibrium of the catalytic reaction (3) tends to reduce further the $H_2S$ and $SO_2$ concentrations as compared to the first bed. The tail gas leaving the bottom of the bed and leaving the reactor via line 52 and control valve 54 has the following composition (on sulphur-free basis):
$H_2S$—0.133%
$SO_2$—0.066%
$H_2O$—33.94%
$N_2$—58.15%
$CO_2$—7.71%

This tail gas may then be passed through a cyclone demister (not shown) to remove sulphur mist from this gas.

It will be noted that in this process, the amount of $H_2S$ leaving the reactor is only about 0.40% of the total amount of combined hydrogen in the incoming gases.

Liquid sulphur collects in a sump 60 at the bottom of the reactor, and leaves via control valve 62 and line 64 which joins line 38; the combined sulphur streams then passing through cooler 40 and valve 42. Between cooler 40 and valve 42 a branch conduit 74 removes some of the cooled liquid sulphur, this being pumped by pump 76 into lines 78 and 80 which supply the cooling sulphur to spray heads 32 and 48 via valves 33 and 49.

The amount of liquid sulphur which is recirculated via line 74 is usually about 10 times the net sulphur production of the reactor. The process may involve recirculation of up to 50 times the net sulphur production; however, usually the range of amount circulated (in terms of mass flow recirculated per mass of net production) will be between 2 and 20.

The following table gives typical gas compositions for the various stages of the process in the plant described. The figures in the table are expressed in terms of flow in poundmolecules per hour. This table also gives typical temperatures at the various stages.

| Species | Acid Gas Entering at 16 | Air | Catalytic Feed Gas Entering Reactor Via Line 25 | 1st stage Exit Gas | Tail Gas Leaving Reactor Via line 52 |
|---|---|---|---|---|---|
| $H_2S$ | 1455.42 | — | 388.06 | 25.23 | 6.30 |
| $SO_2$ | — | — | 194.03 | 12.61 | 3.15 |
| $CO_2$ | 363.90 | — | 363.90 | 363.90 | 363.90 |
| $H_2O$ | 122.53 | 30.13 | 1220.02 | 1582.85 | 1601.78 |
| $N_2+$ | — | 2745.82 | 2745.82 | 2745.82 | 2745.82 |
| $O_2$ | — | 727.71 | — | — | — |
| S vapour | — | — | 873.33 | 65.29 | 4.78 |
| Total | 1941.86 | 3503.66 | 5785.16 | 4795.70 | 4725.73 |
| Temp. °C. | 37.8 | 15.6 | 325 | 275 | 195 |

A full scale commercial plant could include many more beds. The supply of cooling sulphur may be regulated so that the temperature of each of the beds after the first is lower than the next preceding bed; alternatively the means for cooling the liquid sulphur before it is applied to the beds may allow the sulphur to be applied to the beds at successively lower temperatures down the bed. Preferably, separate outlets for sulphur will be provided for each bed so that the sulphur is removed as an individual stream from each bed.

As indicated above, the catalytic reactor of this invention can be used with supplies of feed gas other than the combustion furnace as shown, and for example an important use of the apparatus and process of this invention is expected to be in the production of sulphur from the tail gas of a conventional Claus plant.

FIG. 2 shows a laboratory reactor used to investigate the activity of the Claus catalyst at elevated pressures in the presence of liquid sulphur.

The reactor of FIG. 2 consists of two sections, a lower section 110 for introducing water vapour into the reactor, and an upper section 111 which is the catalytic zone. A slurry comprising 50 g of alumina catalyst having the same composition as described in FIG. 1 and in the form of 2 to 8 mm diameter pellets was contained in the catalytic zone with 350 grams of sulphur. The catalytic zone was heated to a temperature of 160° C. to 350° C. with a furnace 112 as measured by thermocouple 113. The lower section 110, containing water, was heated by furnace 114 to a temperature which, depending on the pressure of the system, would introduce water vapour into the catalytic zone at a constant partial pressure. The temperature was measured by thermocouple 115.

Hydrogen sulphide was introduced into the lower section through inlet 116 and saturated with water before entering the catalytic zone 111 through tube 120. Sulphur dioxide was admitted dry, through inlet 117 and small diameter tube 117a, into the reactor, the upper end of tube 117a being spaced from the walls of tube 120 to allow the hydrogen sulphide to enter the lower end of tube 120 and to mix there with the sulphur dioxide. The inlet gases were balanced with nitrogen and introduced with 2.5% hydrogen sulphide and 1.25% sulphur dioxide at a total flow rate of 100 ml/min. The combined inlet gases were admitted to the bottom of the catalytic zone through tube 120 and bubbled through the submerged catalyst.

The product stream leaving the reactor through outlet 119 was analyzed by gas chromatography to determine the conversion of hydrogen sulphide to elemental sulphur. Generally, the reactor was operated for 4 to 5 hours before sampling.

The following examples illustrate the catalytic reactions achieved:

EXAMPLE 1

To demonstrate the effect of elevated pressures on the activity of the Claus catalyst submerged in liquid sulphur, a number of experimental runs were performed at varying pressures in the above described reactor. The water vapour saturator was not used in this first set of reactions. The operating conditions and results are summarized in Table I.

TABLE I

| $H_2S$ REACTION, SLURRY REACTOR | |
|---|---|
| Pressure | % $H_2S$ Reacted |
| 1 | 15 |
| 3.2 | 50 |
| 6.2 | 72 |
| 8.2 | 96 |

Conditions: Temperature = 160° C. (320° F.)
Inlet gas composition: $N_2$ = 96.3%
$H_2S$ = 2.5%
$SO_2$ = 1.2%
Gas flow = 100 ml/min (at STP)

The results clearly indicate a substantial increase in the conversion of the feedstock gases to elemental sulphur as the pressure is increased from 1 to 8 atmospheres. Additionally, at pressures considerably greater than 1 atmosphere the reaction proceeds efficiently at temperatures as low as 160° C.

EXAMPLE 2

A number of exploratory experimental runs were performed in the above described laboratory reactor in order to investigate the influence of various operating parameters on the Claus catalytic reaction.

The reactor was operated at 160° and 350° C. and at pressures slightly above 1 atm and at 7 atm. The hydrogen sulphide gas stream was bubbled through the water saturator maintained at 80° C. for 1 atm work and at about 135° C. for 7 atm work. The hydrogen sulphide stream was chosen for water saturation as it has a limited solubility as compared to sulphur dioxide.

The results are summarized in Table II.

TABLE II

SUMMARY OF RESULTS

Slurry consisted of 350 g sulphur (powder originally), 50 g alumina Claus catalyst (2-8 mm diameter)

Experiments in Flow Reactor

| Experiment No. | P. Atm. | FEED Temp °C. | $H_2S$ Conc. % | $SO_2$ Conc. % | $H_2O$ Conc. % | PRODUCT $H_2S$ Conv. |
|---|---|---|---|---|---|---|
| 1 | 1 atm | 160 | 2.5 | 1.2 | 30 | 11 |
| 2 | 1 atm | 350 | 2.5 | 1.2 | 30 | Negative |
| 3 | 1 atm | 160 | 2.5 | None | 30 | 2 |
| 4 | 1 atm | 160 | None | 1.2 | 30 | None |
| 5 | 7 atm | 160 | 2.5 | 1.2 | 30 | 100 |
| 6 | 7 atm | 350 | 2.5 | 1.2 | 30 | 80 |
| 7 | 1 atm | 160 | 2.5 | 1.2 | None | 15 |
| 8 | 8 atm | 160 | 2.5 | 1.2 | None | 96 |

Since the experiments were performed at a near constant residence time, an increase in the reaction, provided the reaction is proceeding far away from equilibrium conditions, can be interpreted as an increase in the kinetic reaction rate.

Looking at experiments 7 and 8, in which no water vapour was added to the system, it can be seen that the Claus catalytic reaction proceeded at a rate increased 4 to 7 times by increasing the pressure from 1 to 8 atm.

Comparing the results of experiments 1 and 5 performed at 160° C., an increase in the reaction rate is evident on increasing the pressure from 1 to 7 atm. Additionally, the presence of water vapour does not deleteriously affect the process. Increasing the temperature to 350° C. while increasing the operating pressure from 1 to 7 atm, as shown in experiments 2 and 6, effects an increase in the reaction yield. The kinetic effect is masked, however, since the reacting gas mixture is near equilibrium at 1 atm.

The Claus catalyst was examined after the completion of the experiment and was found to have no sulphate salts. It appears, therefore, that the presence of liquid sulphur inhibits sulphate formation on the catalyst. This fact was confirmed by a further series of tests shown as Example 3.

It should be pointed out that the above experimental work was purposely performed at adverse conditions for the Claus catalytic reaction to proceed. The concentrations of hydrogen sulphide, sulphur dioxide and water in the feedstock gas stream were similar to a tail gas stream; and, in most cases, the water vapour content was raised above the level expected to be formed in the process.

EXAMPLE 3

Tests were performed to determine the extent of catalyst sulphation, using the trickle-bed reactor shown in FIG. 3. This reactor is essentially a cylindrical reactor vessel 130 having a central catalyst bed 132 separated from the ends of the vessel by upper and lower distributors 134 and 136 each constituted by a mass of stainless steel balls. Thermocouples 140 and 142 are positioned to sense the temperatures at the upper and lower ends of the catalyst bed. The upper end of vessel 130 is connected to a first inlet tube 142 for liquid sulphur, and a second inlet tube 144 having a branch 146. These inlet tubes are surrounded by a heated oven 148. The lower end of tube 130 has an outlet 150 which may lead to a condenser and backpressure regulator (not shown).

The catalyst bed 132 in these experiments contained 5 gram of catalyst (Kaiser S201, 2 mm dia particles); and the distributors 134 and 136 contained (together) 100 gram of stainless steel balls. This experiment consisted of flowing liquid sulphur (at about 2 ml/min), sulphur dioxide (at 60 ml/min) and oxygen (2 ml/min) cocurrently for 3 hours at 160° C. and at about 1 atmos. The experiment was repeated at 350° C.

At the end of the experiment the reactor was purged with nitrogen, cooled to room temperature and the catalyst removed. About 0.5 gram of the finely ground catalyst was stirred with 25 ml hot distilled water, filtered and tested for sulphate ions ($SO_4^=$) by adding drops of 2% $BaCl_2$ solution.

It was found that the extent of sulphation at 160° C. and 350° C. was below the limit of detection, which is 0.005 gram (for one gram of sample equivalent to about 0.2% $SO_4$). This compares with a level of 3% $SO_4^=$ on alumina at 300° C. using low partial pressure of reactants during the conventional Claus process. For the concentrations of oxygen and $SO_2$ used in these experiments, high degrees of sulphation will be expected under normal Claus reaction. The resistance of the catalyst to sulphation, which appears to be related to the percolating liquid sulphur, is a further attractive feature of the process of this invention, catalyst sulphation being a common problem with conventional Claus plants.

EXAMPLE 4

Although the liquid sulphur prevents sulphation, the conversion rates achieved in the Claus reaction at atmospheric pressures with liquid sulphur are very low, and only become high when the pressure is raised. The relative effect of raising pressure without liquid sulphur being present is marginal but is very marked when liquid sulphur is present. This is shown by the following table of results obtained with the reactor of FIG. 3, using 8 gram of alumina KS201 catalyst (2 mm) with 200 g steel balls, with a residence time of less than 5 seconds, at a temperature of 160° C. and at pressures of 1 atm and 20 atm, with and without percolating liquid sulphur. Experiment No. 4 of this series involves conditions close to what would be used in one bed of a commercial reactor. It may be noted that the high conversion in experiment No. 2 will be reduced as sulphur saturates the bed.

TABLE III

| EXP # | Reactor Pressure | Feed p$H_2S$ Torr | Feed p$SO_2$ Torr | [$H_2O$] | [Liq. Sulphur] | Product $H_2S$ Conv % | Product $SO_2$ Conv % |
|---|---|---|---|---|---|---|---|
| 1 | ~1 Atm. | 3.3 | 1.9 | 30% | None | 80.2 | 82.1 |
| 2 | ~20 Atm. | 3.3 | 1.9 | 30% | — | 92.1 | 81.0 |
| 3 | ~1 Atm. | Same | Same | 30% | ~2-3 ml/min | Close to Zero | Close to Zero |
| 4 | ~20 Atm. | Same | Same | 30% | ~2-3 | 85.1 | 70 |

TABLE III-continued

| EXP # | Reactor Pressure | Feed | | | | Product | |
|---|---|---|---|---|---|---|---|
| | | pH$_2$S Torr | pSO$_2$ Torr | [H$_2$O] | [Liq. Sulphur] ml/min | H$_2$S Conv % | SO$_2$ Conv % |

Advantages and Features

Following are some of the advantages and features of the preferred embodiment of the process:

1. High yields are realized due to the equilibrium effect of high pressure on the Claus catalytic reaction.

2. A substantial increase in the reaction rate of the Claus catalytic reaction is observed at high pressures.

3. Operating at high pressures reduces the vessel size required in the catalytic step of the Claus process.

4. At elevated pressures the saturated sulphur vapour losses are reduced since, at a fixed temperature and thus at a fixed sulphur vapour pressure, the percentage of the gas phase present as elemental sulphur vapour decreases as the pressure is increased. This reduced sulphur vapor content also favours high equilibrium yields.

5. Due to the high pressures available, any sulphur mist which is formed can be effectively removed.

6. The expensive and inefficient gas to liquid or gas to gas heat exchange processes used in the condensing and reheating steps in the conventional Claus plants may be eliminated. By the use of the present process, one may employ a liquid to liquid heat exchange. The gas to liquid heat exchange carried out in the catalyst bed involves a more efficient direct contact of the product gases with the liquid sulphur coolant.

7. The presence of liquid sulphur on the Claus catalyst inhibits the formation of sulphate salts, a known catalyst poison in the Claus catalytic reaction.

While the process of the present invention has been described in terms of the illustrative embodiment, it should be understood that it is not so limited, since many variations of the process will be apparent to persons skilled in the related art without departing from the true spirit and scope of the invention as defined by the following claims.

We claim:

1. A sulphur producing process in which hydrogen sulphide and sulphur dioxide gases are continuously introduced into a reactor containing a bed of a catalyst which causes these gases to react to produce elemental sulphur, wherein said gases when in the reactor are maintained at such conditions of temperature and pressure that free water in the reactor exists only as water vapour and sulphur is condensed in the catalyst bed, and wherein said sulphur is continuously removed from the bed as a liquid while the bed is continuously maintained substantially saturated with liquid sulphur, and wherein the pressure in the reactor is maintained at at least 5 atmospheres absolute.

2. The process according to claim 1 wherein liquid sulphur is continually added to the top of the bed to maintain the catalyst substantially saturated with liquid sulphur.

3. The process according to claim 1 wherein the hydrogen sulphide and sulphur dioxide gases enter the reactor in a substantially stoichiometric ratio of 2 volumes of hydrogen sulphide to 1 volume of sulphur dioxide.

4. The process according to claim 2 wherein the hydrogen sulphide and sulphur dioxide gases enter the reactor in a substantially stoichiometric ratio of 2 volumes of hydrogen sulphide to 1 volume of sulphur dioxide.

5. The process according to claim 1 wherein the pressure within the reactor is between 10 and 20 atmospheres absolute pressure.

6. The process according to claim 2 wherein the pressure within the reactor is between 10 and 20 atmospheres absolute pressure.

7. The process according to claim 1 wherein the pressure within the reactor is less than 50 atmospheres absolute.

8. The process according to claim 2 wherein the pressure within the reactor is less than 50 atmospheres absolute.

9. The process according to claim 1 wherein said hydrogen sulphide and sulphur dioxide gases are such as result from partial combustion of an acid gas containing between 40% and 100% hydrogen sulphide.

10. The process according to claim 9 wherein the bed exit gas temperature is at least 160° C., and wherein the pressure is such that with a residence time for the gases of no more than 15 seconds, at least 99% of the sulphur content of the acid gas is removed from the gases passing through the reactor.

11. The process according to claim 3 wherein the bed exit gas temperature is at least 160° C., and wherein the pressure is such that with a residence time for the gases of no more than 15 seconds, at least 99% of the total combined hydrogen of the incoming gases leaves the reactor as water vapour.

12. The process according to claim 4 wherein the bed exit gas temperature is at least 160° C. and wherein the pressure is such that with a residence time for the gases of no more than 15 seconds at least 99% of the total combined hydrogen of the incoming gases leaves the reactor as water vapour.

13. The process according to claim 3 wherein the pressure is chosen so that, with the bed exit gas temperature of at least 160° C. and with a residence time for the gases of no more than 15 seconds, the outlet hydrogen sulphide concentration is less than 1500 parts per million and the outlet sulphur dioxide concentration is less than 750 parts per million.

14. The process according to claim 4 wherein the pressure is chosen so that, with the bed exit gas temperature of at least 160° C. and with a residence time for the gases of no more than 15 seconds, the outlet hydrogen sulphide concentration is less than 1500 parts per million and the outlet sulphur dioxide concentration is less than 750 parts per million.

15. A process according to claim 1 wherein the operating pressure P in absolute atmospheres is at least that given by the formula:

$$P = 1.10 \left\{ \frac{\xi_c(P)(1 - \xi_c(1))}{\xi_c(1)(1 - \xi_c(P))} \right\}^3$$

where;

$\xi_c(1) = 1 - \exp(-6.0698 \times 10^{-5} T^2 + 0.048175T - 11.0933 + 0.282x^2 - 0.667x)$ $\xi_c(P) = 0.99$ T = bed exit gas temperature
x = mole fraction of $H_2S$ in acid gas
and where the parameters are constrained to the following ranges:
0.2 < x < 1.0
160 < T < 300
5 < P < 50

16. A process according to claim 2 wherein the operating pressure P in absolute atmospheres is at least that given by the formula:

$$P = 1.10 \left\{ \frac{\xi_c(P)(1 - \xi_c(1))}{\xi_c(1)(1 - \xi_c(P))} \right\}^3$$

where;

$\xi_c(1) = 1 - \exp(-6.0698 \times 10^{-5} T^2 + 0.048175T - 11.0933 + 0.282x^2 - 0.667x)$ $\xi_c(P) = 0.99$ T = bed exit gas temperature
x = mole fraction of $H_2S$ in acid gas
and where the parameters are constrained to the following ranges:
0.2 < x < 1.0
160 < T < 300
5 < P < 50

17. A process according to claim 3 wherein the operating pressure P in absolute atmospheres is at least that given by the formula:

$$P = 1.10 \left\{ \frac{\xi_c(P)(1 - \xi_c(1))}{\xi_c(1)(1 - \xi_c(P))} \right\}^3$$

where;

$\xi_c(1) = 1 - \exp(-6.0698 \times 10^{-5} T^2 + 0.048175T - 11.0933 + 0.28x^2 - 0.667x)$ $\xi_c(P) = 0.99$ T = bed exit gas temperature
x = mole fraction of $H_2S$ in acid gas
and where the parameters are constrained to the following ranges:
0.2 < x < 1.0
160 < T < 300
5 < P < 50

18. A process according to claim 4 wherein the operating pressure P in absolute atmospheres is at least that given by the formula:

$$P = 1.10 \left\{ \frac{\xi_c(P)(1 - \xi_c(1))}{\xi_c(1)(1 - \xi_c(P))} \right\}^3$$

where;

$\xi_c(1) = 1 - \exp(-6.0698 \times 10^{-5} T^2 + 0.048175T - 11.0933 + 0.282x^2 - 0.667x)$ $\xi_c(P) = 0.99$ T = bed exit gas temperature
x = mole fraction of $H_2S$ in acid gas
and where the parameters are constrained to the following ranges:
0.2 < x < 1.0
160 < T < 300
5 < P < 50

19. A process according to claim 1 wherein the operation pressure P in absolute atm, is at least that given by the formula:

$$P = 1.10 \left\{ \frac{\left[\xi_R(P) + \frac{1}{P}\eta(1)\right][1 - \xi_c(1)]}{\xi_c(1)\left[1 - \xi_R(P) - \frac{1}{P}\eta(1)\right]} \right\}^3$$

where;

$\eta(1) = \exp(f_R(T,x)) - \exp(f_c(T,x))$
$\xi_c(1) = 1 - \exp(f_c(T,x))$
$\xi_R(P) = 0.99$
$f_R(T,x) = -2.83 \times 10^{-5} T^2 + 0.05064T - 10.4578 + 0.862x^2 - 1.83x$
$f_c(T,x) = -6.0698 \times 10^{-5} T^2 + 0.04818T - 11.0933 + 0.282x^2 - 0.667x$
x = mole fraction of $H_2S$ in the acid gas
T = reactor exit temperature in °C
and where the parameters are constrained to the following ranges:
0.2 < x < 1.0
160 < T < 300

20. A process according to claim 2 wherein the operation pressure P in absolute atm, is at least that given by the formula:

$$P = 1.10 \left\{ \frac{\left[\xi_R(P) + \frac{1}{P}\eta(1)\right][1 - \xi_c(1)]}{\xi_c(1)\left[1 - \xi_R(P) - \frac{1}{P}\eta(1)\right]} \right\}^3$$

where;

$\eta(1) = \exp(f_R(T,x)) - \exp(f_c(T,x))$
$\xi_c(1) = 1 - \exp(f_c(T,x))$
$\xi_R(P) = 0.99$
$f_R(T,x) = -2.83 \times 10^{-5} T^2 + 0.05064T - 10.4578 + 0.862x^2 - 1.83x$
$f_c(T,x) = -6.0698 \times 10^{-5} T^2 + 0.04818T - 11.0933 + 0.282x^2 - 0.667x$
x = mole fraction of $H_2S$ in the acid gas
T = reactor exit temperature in °C
and where the parameters are constrained to the following ranges:
0.2 < x < 1.0
160 < T < 300

21. A process according to claim 3 wherein the operation pressure P in absolute atm, is at least that given by the formula:

$$P = 1.10 \left\{ \frac{\left[\xi_R(P) + \frac{1}{P}\eta(1)\right][1 - \xi_c(1)]}{\xi_c(1)\left[1 - \xi_R(P) - \frac{1}{P}\eta(1)\right]} \right\}^3$$

where;

$\eta(1) = \exp(f_R(T,x)) - \exp(f_c(T,x))$
$\xi_c(1) = 1 - \exp(f_c(T,x))$
$\xi_R(P) = 0.99$
$f_R(T,x) = -2.83 \times 10^{-5} T^2 + 0.05064T - 10.4578 + 0.862x^2 - 1.83x$ $f_c(T,x) = -6.0698 \times 10^{-5}T^2 + 0.04818T - 11.0933 + 0.282x^2 - 0.667x$ x = mole fraction of H₂S in the acid gas
T = reactor exit temperature in °C
and where the parameters are constrained to the following ranges:
$0.2 < x < 1.0$
$160 < T < 300$ 22. A process according to claim 4 wherein the operation pressure P in absolute atm, is at least that given by the formula:

$$P = 1.10 \left\{ \frac{\left[\xi_R(P) + \frac{1}{P}\eta(1)\right][1 - \xi_c(1)]}{\xi_c(1)\left[1 - \xi_R(P) - \frac{1}{P}\eta(1)\right]} \right\}^3$$

where;
$\eta(1) = \exp(f_R(T,x)) - \exp(f_c(T,x))$
$\xi_c(1) = 1 - \exp(f_c(T,x))$
$\xi_R(P) = 0.99$
$f_R(T,x) = -2.83 \times 10^{-5}T^2 + 0.05064T - 10.4578 + 0.862x^2 - 1.83x$
$f_c(T,x) = -6.0698 \times 10^{-5}T^2 + 0.04818T - 11.0933 - 0.282x^2 - 0.667x$ x = mole fraction of H₂S in the acid gas
T = reactor exit temperature in °C
and where the parameters are constrained to the following ranges:
$0.2 < x < 1.0$
$160 < T < 300$ 23. A process according to claim 1 wherein the bed exit gas temperature is between about 125° C. and about 375° C.

24. A process according to claim 2 wherein the bed exit gas temperature is between about 125° C. and about 375° C.

25. A process according to claim 3 wherein the bed exit gas temperature is between about 125° C. and about 375° C.

26. A process according to claim 4 wherein the bed exit gas temperature is between about 125° C. and about 375° C.

27. A process according to claim 5 wherein the bed exit gas temperature is between about 125° C. and about 375° C.

28. A process according to claim 6 wherein the bed exit gas temperature is between about 125° C. and about 375° C.

29. A process according to claim 2 wherein said sulphur removed from the bed is divided into a stream of product sulphur and a stream of recirculating sulphur, the recirculating sulphur being returned to the top of said catalyst bed to maintain the whole catalyst bed substantially saturated with liquid sulphur.

30. A process according to claim 29 including the step of cooling the recirculating sulphur before it is returned to the bed.

31. A process according to claim 29 wherein said recirculating sulphur is controlled as to amount and temperature to maintain a bed exit gas temperature of about 150° C. to 200° C.

32. A process according to claim 1 wherein the catalyst bed is cooled by applying recirculated, cooled liquid sulphur to the bed, the total amount of such liquid sulphur being recirculated to the reactor being no more than 50 times the amount of net production of sulphur produced by the reactor.

33. A process according to claim 32 wherein the amount of liquid sulphur recirculated to the reactor is between 2 to 20 times the amount produced in the reactor.

34. A process according to claim 2 wherein said reactor contains several catalyst beds arranged to receive the gases in turn, and in which liquid sulphur is removed as an individual stream from each bed, and wherein cooling is used to maintain each bed at a temperature cooler than the bed which has previously received the gas stream.

35. A process according to claim 29 wherein said reactor contains several catalyst beds arranged to receive the gases in turn, and in which liquid sulphur is removed as an individual stream from each bed, and wherein liquid sulphur is applied to each of said beds to maintain each bed at a temperature less than the temperature of the bed which has previously received the gas stream to cool the beds and to substantially saturate the beds.

36. A process according to claim 32 wherein said reactor contains several catalyst beds arranged to receive the gases in turn, and in which liquid sulphur is removed as an individual stream from each bed, and wherein liquid sulphur is applied to each of said beds to maintain each bed at a temperature less than the temperature of the bed which has previously received the gas stream to cool the beds and to substantially saturate the beds.

37. A process according to claim 32 wherein said reactor contains several catalyst beds arranged to receive the gases in turn, and in which liquid sulphur is removed as an individual stream from each bed, and wherein liquid sulphur is applied to each of said beds to maintain each bed at a temperature less than the temperature of the bed which has previously received the gas stream to cool the beds and to substantially saturate the beds.

38. A process according to claim 33 wherein said reactor contains several catalyst beds arranged to receive the gases in turn, and in which liquid sulphur is removed as an individual stream from each bed, and wherein liquid sulphur is applied to each of said beds to maintain each bed at a temperature less than the temperature of the bed which has previously received the gas stream to cool the beds and to substantially saturate the beds.

39. A process according to claim 2 wherein both the liquid sulphur and the gases pass cocurrently through the bed.

40. The process according to claim 34 in which said H₂S and SO₂ gases are such as result from partial combustion of an acid gas containing between 40% and 100% H₂S and which is effective to remove at least 99% of the sulphur from the incoming gases and wherein the heat of reaction is removed entirely by said cooling means.

41. A process according to claim 1 in which the hydrogen sulphide and sulphur dioxide enter the reactor as a well mixed stream.

42. A process according to claim 2 in which the hydrogen sulphide and sulphur dioxide enter the reactor as a well mixed stream.

43. A process according to claim 3 in which the hydrogen sulphide and sulphur dioxide enter the reactor as a well mixed stream.

44. A process according to claim 4 in which the hydrogen sulphide and sulphur dioxide enter the reactor as a well mixed stream.

45. A continuous process for producing sulphur from the tail gas of a conventional Claus sulphur plant, comprising the steps of:
passing said tail gas stream through a compressor and thence at a pressure considerably higher than atmospheric into reactor means containing a bed of catalyst which causes these gases to react to produce elemental sulphur, the reactor means being maintained at such conditions of pressure and temperature that free water in the reactor means exists only as water vapour and sulphur is condensed in the catalyst bed, the sulphur being removed therefrom as a liquid.

46. A process according to claim 45 wherein the bed exit gas temperature is at least 160° C., and wherein the pressure in the reactor means is such that with a residence time for the gases in the catalyst of no more than 15 seconds, at least 99% of the total combined hydrogen of the tail gas stream leaves said reactor means as water vapour.

47. A method for treating a gas stream containing hydrogen sulphide and sulphur dioxide to produce elemental sulphur and an effluent stream of reduced hydrogen sulphide and sulphur dioxide content comprising the following steps:
(a) compressing the stream containing the hydrogen sulphide and sulphur dioxide;
(b) introducing the compressed stream of step (a) into a catalytic reactor containing a catalyst bed;
(c) reacting the compressed stream in the catalyst bed at a pressure within the range of 5-50 atmospheres absolute to produce elemental sulphur while said catalyst bed is saturated with liquid sulphur;
(d) spraying liquid sulphur on said catalyst bed during the reaction of step (c);
(e) removing a stream of liquid sulphur from said catalyst bed; and,
(f) removing an effluent stream of reduced hydrogen sulphide and sulphur dioxide content from said catalytic reactor.

48. The method as set forth in claim 47 wherein the temperature of the liquid sulphur sprayed on said catalyst bed is within the range of 120°-150° C.

49. The method as set forth in claim 47 wherein the effluent stream removed from the catalytic reactor is at a temperature between the range of 125°-375° C.

50. The method as set forth in claim 48 wherein the effluent stream removed from the catalytic reactor is at a temperature between the range of 125°-375° C.

51. The method as set forth in claim 47 wherein the gas stream to be treated passes successively between several catalyst beds saturated with liquid sulphur with each bed being cooled by liquid sulphur and at a pressure between the range of 5-50 atmospheres absolute and with a stream of liquid sulphur being removed from each bed.

52. The method as set forth in claim 48 wherein the gas stream to be treated passes successively between several catalyst beds saturated with liquid sulphur with each bed being cooled by liquid sulphur and at a pressure between the range of 5-50 atmospheres absolute and with a stream of liquid sulphur being removed from each bed.

53. The method as set forth in claim 49 wherein the gas stream to be treated passes successively between several catalyst beds saturated with liquid sulphur with each bed being cooled by liquid sulphur and at a pressure between the range of 5-50 atmospheres absolute and with a stream of liquid sulphur being removed from each bed.

54. The method as set forth in claim 50 wherein the gas stream to be treated passes successively between several catalyst beds saturated with liquid sulphur with each bed being cooled by liquid sulphur and at a pressure between the range of 5-50 atmospheres absolute and with a stream of liquid sulphur being removed from each bed.

55. The method as set forth in claim 47 wherein in step (c) the pressure during the reaction is maintained between the range of 10-20 atmospheres absolute.

56. The method as set forth in claim 48 wherein in step (c) the pressure during the reaction is maintained between the range of 10-20 atmospheres absolute.

57. The method as set forth in claim 49 wherein in step (c) the pressure during the reaction is maintained between the range of 10-20 atmospheres absolute.

58. The method as set forth in claim 50 wherein the pressure during the reaction within each bed is maintained between the range of 10-20 atmospheres absolute.

59. The method as set forth in claim 47 wherein liquid sulphur is flowed concurrently with the gas stream to be treated.

60. The method as set forth in claim 48 wherein liquid sulphur is flowed concurrently with the gas stream to be treated.

61. The method as set forth in claim 49 wherein liquid sulphur is flowed concurrently with the gas stream to be treated.

62. The method as set forth in claim 50 wherein liquid sulphur is flowed concurrently with the gas stream to be treated.

63. The method as set forth in claim 47 wherein said treatment is performed continuously.

64. The method as set forth in claim 48 wherein said treatment is performed continuously.

65. Apparatus for reacting hydrogen sulphide and sulphur dioxide gases together to remove sulphur from said bases, including:
a reactor containing a bed of a catalyst which causes said gases to react and produce elemental sulphur;
supply means suitable for supplying compressed gases including hydrogen sulphide and sulphur dioxide to said reactor at a pressure of at least 5 atmospheres absolute;
means for removing liquid sulphur from said bed and for passing the liquid sulphur out of the reactor; and
means for cooling said bed so that the conditions of temperature and pressure in the bed allow the compressed hydrogen sulphide and sulphur dioxide to react to produce liquid sulphur in said bed while free water therein only exists as water vapour.

66. Apparatus according to claim 65 wherein said reactor contains at least three beds of catalyst, each of said beds having means for removing liquid sulphur therefrom as a separate stream and for passing the liquid sulphur out of the reactor.

67. Apparatus according to claim 65 wherein said supply means includes a conventional modified Claus apparatus producing a tail gas, and wherein said compressor means includes a compressor for compressing said tail gas.

68. Apparatus according to claim 65 wherein said catalyst bed is one of a series which receive the gases in turn, wherein the first bed of said series receives gases which result from partial combustion of an acid gas containing between 40% and 100% $H_2S$ and wherein said beds are effective to remove at least 99% of the sulphur from the incoming gases, and wherein said cooling means for the beds are the sole means for removing the heat of reaction.

* * * * *

UNITED STATES PATENT AND TRADEMARK OFFICE
CERTIFICATE OF CORRECTION

PATENT NO. : 4,280,990
DATED : July 28, 1981
INVENTOR(S) : Richard F. Jagodzinski, Richard K. Kerr It is certified that error appears in the above-identified patent and that said Letters Patent are hereby corrected as shown below:

Column 17, line 26 change "-0-" to --+0- --
Column 18, line 14 change "29" to --31--
Column 20, line 44 change "bases" to --gases--

Signed and Sealed this

Thirteenth Day of October 1981

[SEAL]

Attest:

GERALD J. MOSSINGHOFF

Attesting Officer

Commissioner of Patents and Trademarks